United States Patent Office 3,824,286
Patented July 16, 1974

3,824,286
PREPARATION OF POLYACETYLALKYLENE DIAMINES
Jan Christiaan Grimmelikhuysen, Rotterdam, and Arnold Schroeder, Deventer, Netherlands, assignors to Lever Brothers Company, New York, N.Y.
No Drawing. Filed June 28, 1971, Ser. No. 157,687
Claims priority, application Great Britain, July 7, 1970, 32,850/70
Int. Cl. C07c 103/30
U.S. Cl. 260—561 R  12 Claims

ABSTRACT OF THE DISCLOSURE

An improved process for the preparation of polyacetylalkylene diamines in good yields is provided, which process comprises reacting a compound having the general formula:

$$H_2N-R-NH_2$$

in which R represents an alkylene or substituted alkylene group having 2 to 6 carbon atoms in a straight chain connecting both nitrogen atoms, with acetic acid to obtain the diacetyl compound. The product thus obtained is directly suitable for further acetylation, preferably using acetic anhydride as the acetylating agent.

BACKGROUND OF THE INVENTION

Field of the Invention

Manufacture of organic compounds.

Description of the Prior Art

Polyacetylalkylene diamines, such as tetraacetylethylene diamine, are useful compounds and are known as e.g. peracid bleach precursors which can be used as a constituent of washing and bleaching compositions containing an oxygen-yielding bleaching agent treating agents for cellulose, and reagents in various processes.

Tetraacetylethylene diamine has been obtained by Franchimont et al. (Rec. Trav. Chim., vol. 30, 1911, pages 183–185) by reacting acetic anhydride on diacetylethylene diamine for several hours at boiling temperature.

As is already known, the acetylation reaction of alkylene diamine to the tetraacetylalkylene diamine, e.g. 1,2-ethylene diamine to N,N,N',N'-tetraacetylethylene proceeds in stages, viz. the formation of the N,N'-diacetyl derivative, followed by the formation of the triacetyl and tetraacetyl derivatives.

The quality and yield of the tetraacetyl endproduct depend very much on the purity and type of contaminants of the diacetyl intermediate. Therefore, in the normal process for producing tetraacetylalkylene diamine, the diacetyl derivative obtained from the first reaction stage is isolated from the reaction mixture and purified prior to subjecting it to the second acetylation step.

Belgian Patent Specification No. 729,185 describes the production of tetraacetyl alkylene diamines by the acetylation of diacetyl alkylene diamines with ketene in the presence of a catalyst, the diacetyl alkylene diamine being obtained from the reaction of alkylene diamine also with ketene.

Though ketene in itself is a good acetylating agent and can be used conveniently on a small scale, it has some drawbacks as a reagent, being a gas at normal pressure and temperature. Besides, a commercial process consuming large amounts of ketene gas would need in general an on-site ketene-generating unit e.g. form acetone-cracking.

The invention now provides a process for the preparation of polyacetylalkylene diamines, wherein the foregoing drawbacks are eliminated or at least mitigated to a substantial degree.

SUMMARY OF THE INVENTION

This invention relates to a process for the preparation of polyacetyl alkylenediamines, particularly N,N'-diacetylalkylene diamines, N,N,N'-triacetylalkylene diamines and N,N,N',N'-tetraacetylalkylene diamines, from alkylene diamines.

Accordingly an object of the present invention is the provision of an improved process for preparing N,N'-diacetylalkylene diamine by reacting alkylene diamine with acetic acid.

Another object of the present invention is the provision of a process for preparing N,N,N'-triacetylalkylene diamine and N,N,N',N'-tetraacetylalkylene diamine by a two-stage acetylation reaction of alkylene diamine, using acetic acid as the acetylating agent in the first stage.

DESCRIPTION OF THE INVENTION

This invention relates to an improved process for the preparation of polyacetylalkylene diamines, particularly N,N'-diacetylalkylene diamines, N,N,N'-triacetylalkylene diamines, and N,N,N',N'-tetraacetylalkylene diamines.

Polyacetylalkylene diamines, such as tetraacetylethylene diamine, are useful compounds and are known e.g. as per acid bleach precursors which can be used as a constituent of washing and bleaching compositions containing an oxygen-yielding bleaching agent, treating agents for cellulose, and as reagents for various processes.

As is already known, the acetylation reaction of alkylene diamine to tetraacetylalkylene diamine, e.g. 1,2-ethylene diamine to N,N,N',N'-tetraacetylethylene diamine proceeds in stages, viz. the formation of the N,N'-diacetyl derivative, subsequently followed by the formation of the triacetyl and tetraacetyl derivatives.

The quality and yield of the tetraacetyl endproduct depend very much on the purity and type of contaminants of the diacetyl intermediate. Therefore, in the normal process for producing tetraacetylalkylene diamine, the diacetyl derivative obtained from the first reaction stage is isolated from the reaction mixture and purified prior to subjecting it to the second acetylation step.

The invention now provides a method which produces a diacetylalkylene diamine which is directly suitable for use in the second acetylation step.

It is an object of the present invention to provide a process for preparing a polyacetyl alkylene diamine, which process includes the step of reacting a compound having the general formula $H_2N-R-NH_2$ in which R represents an alkylene or substituted alkylene group having 2 to 6 carbon atoms in a straight chain connecting both nitrogen atoms, with acetic acid and distilling the water of reaction from the reaction mixture, to obtain a reaction product comprising diacetylalkylene diamine.

Another object of the present invention is to provide a process for the preparation of triacetyl- and tetraacetyl-alkylene diamines, which process comprises the steps of reacting a compound having the general formula $$H_2N-R-NH_2$$

in which R represents an alkylene or substituted alkylene group having 2 to 6 carbon atoms in a straight chain connecting both nitrogen atoms, with acetic acid, distilling the water of reaction from the reaction mixture, to obtain a reaction product comprising the diacetyl compound, and subjecting said reaction product to a further acetylation reaction step. The latter acetylation reaction may be conveniently carried out using an acetylating agent known per se for this type of reactions, such as ketene and acetic anhydride.

In the preferred embodiment of the invention alkylene diamine is acetylated with acetic acid to its corresponding N,N'-diacetylalkylene diamine, and acetic anhydride is used as the acetylating agent in the second acetylation step according to the following reaction scheme:

(1) $NH_2-R-NH_2+2CH_3COOH \rightarrow$
$CH_3CO-NH-R-NH-COCH_3+2H_2O$ (2) $CH_3CO-NH-R-NH-COCH_3+2(CH_3CO)_2O \rightarrow$
$(CH_3CO)_2N-R-N(COCH_3)_2+2CH_3COOH$ Though the invention will be further explained and illustrated in detail, mainly with respect to the preparation of some polyacetylalkylene diamines, it should be understood that the invention is not restricted thereto, as the reaction is applicable to any suitable reactive alkylene diamine or its monohydrates, such as propylene diamine, butylene - 1,2 - diamine, butylene-1,3-diamine, 2-methyl-butylene-1,3-diamine and hexamethylenediamine.

As can be seen from the above reaction scheme, water of reaction is produced only in the first reaction. For practical reasons the second stage of the process is carried out using adequate excess of acetic anhydride to complete the reaction, as acetic acid is liberated during the formation of the triacetyl and tetraacetyl compound.

A considerable advantage of this embodiment is that the acetic acid which is formed as a by-product in the second stage of the process can be economically used in the first acetylation process. A further advantage is that the whole process does not require the presence of any catalyst known to be used in acetylation processes, nor the use of an additional solvent, and yet gives yields at the end which are comparable to or even higher than the prior art processes.

Although the use of acetic acid as an acetylating agent for amines is known, its use has not hitherto been suggested for preparing polyacetylalkylene diamines.

It was observed that when the acetic reaction is carried out with alkylene diamines, e.g. with ethylene diamine, propylene-1,2-diamine, to prepare N,N'-diacetylalkylene diamines, and removing simultaneously the water of reaction by distillation from the reaction mixture while the reaction is proceeding, possibly together with excess acetic acid used, the reaction product obtained in such a way tends to be contaminated with a by-product of possibly cyclic nature which will cause rather severe discolourations during the subsequent conversion of the diacetyl diamines with acetic anhydride or other acetylating agents into the corresponding N,N,N',N'-tetraacetyl-alkylene diamines. The consequence is that final yields obtained are generally unsatisfactory.

Surprisingly, the formation of this by-product can be suppressed and higher yields are obtained when according to the invention the water of reaction formed during the reaction of acetic acid with the alkylene diamine at higher temperatures is kept in the reaction liquid for some time before it is removed from the reaction mixture. Preferably the water is kept in the raection liquid until the reaction has progressed for more than half-way towards its completion, and eventually until the reaction is almost nearing its end before starting its removal. The reaction is completed during the removal of the water of reaction by distillation, giving yields of around 95% or higher.

The reactants are brought together in stoichiometric amounts or preferably with a slight excess of acetic acid, e.g. an excess of up to 25 mol percent. A higher excess is possible but is not necessary in general. Reaction starts almost instantaneously after contact of the two reactants, with liberation of heat of reaction causing the temperature of the reaction mixture to increase.

Though the manner of adding the two reactants to each other is not critical for the yield, it has some effect on the colour of the product obtained. In the preferred form of the present invention acetic acid is added gradually to the alkylene diamine without external heating, since it also gives a most convenient way of controlling the progress of the reaction, as will be explained below.

Depending on the type of alkylene diamine which is acetylated, the temperature of the reaction mixture during addition of the acetic acid increases to a level varying between 80°–130° C. By increasing the bottom temperature further to about 130°–170° C., the water of reaction is at least partly liberated and reflux can be started if necessary. The progress of the reaction can be followed by titration of the residual alkalinity of the reaction mixture, i.e. determining the unreacted $NH_2$ groups in glacial acetic acid with perchloric acid according to known analytical technique and expressed in m. eq./g. substance. When this value has decreased to 50–10%, preferably 40–20% of its initial value, the removal of water from the reaction mixture can be started by distillation at atmospheric pressure, if necessary while increasing the bottom temperature at a level of from about 130° to about 200° C.

Advantageously the rate of water removal should be so adjusted that some water is kept in the reaction mixture as long as the reaction is still proceeding. It has been established that a rate of water removal during distillation not exceeding 0.06 mol $H_2O$ per minute per mol reacting diamine, particularly between 0.01–0.04 mol $H_2O$ per minute per mol reacting diamine gives beneficial results. If necessary the last stage of the distillation may be carried out under subatmospheric pressure.

In the case of ethylene diamine the temperature of the reaction mixture during the addition of the acetic acid is preferably kept at 80°–120° C., either by cooling or by regulating the rate of acetic acid addition. The water treatment of the reaction mixture is carried out conveniently using reflux, starting at a bottom temperature of about 145° C. which is lowered somewhat during the reflux period, normally to about 125° C. The distillation and removal of water are finished at a bottom temperature of 170°–180° C.

In one embodiment of the invention an inert gas, e.g. $N_2$ gas, is used, if necessary, as a cover gas and entrainer for the water to be removed during distillation. It was observed that introducing a slight stream of nitrogen could lead to a further improvement of the colour of the diacetylalkylene diamine.

For producing the triacetyl-, tetraacetylalkylene diamine or mixtures thereof the diacetylalkylene diamine obtained from the above reaction step is reacted preferably with excess acetic anhydride at boiling temperatures distilling off the acetic acid formed during the reaction at bottom temperatures increasing from 120°–160° C.

For this purpose either a cooled crystallised diacetyl-alkylene diamine or the molten substance as obtained from the first acetylation process may be used.

The amount of acetic anhydride used in this reaction should be at least two mol-equivalents with respect to the amount of the diacetylakylene diamine, preferably more, in order to have adequate amounts left in the reaction vessel functioning as a solvent for the reaction product. This reaction product crystallises out and can be isolated after all the mother liquor has been removed. The acetic acid collected from this reaction can be recirculated for use as acetylating agent in the first reaction.

EXAMPLE I

Preparation of N,N'-diacetyl ethylene diamine (DAED)

A reaction vessel, provided with stirrer, thermometer, dropping funnel and reflux cooler (later to be replaced by a descending cooler and receiver) was filled with 483.8 g. of ethylene diamine 99.2% (8 mols). By means of the dropping funnel, 1008 g. of acetic acid (16 mols+5% excess) was added in 40 minutes. ¾ of this quantity was added under slight cooling, maintaining the temperature at about 80° C. The remainder was added without cooling, the temperature rising to about 120° C. with stirring and introduction of a slow stream of nitrogen, the mixture was heated to 145° C. where reflux began. In two hours the bottom temperature fell to about 125° C. and the residual alkalinity showed a decrease to 20% of its initial value, estimated by titration with perchloric acid in glacial acetic acid. Then the reflux cooler was replaced by a descending cooler and the water of reaction distilled off by increasing the bottom temperature in 4 hours from 125 to about 175° C. During this period the residual alkalinity decreased further to about 3% of its initial value. Finally, remaining water was removed by heating for about 1 hour in vacuum at about 30 mm. Hg-pressure till the residual alkalinity value had decreased to about 1% of its initial value. The reaction product obtained by pouring out on a stainless steel dish, showed an alkalinity of 0.16 meq. per g. substance. Yield 1138 g.=99%. M.P. 170–171° C Content of any cyclic impurities less than 1%.

EXAMPLE II

Preparation of N,N,N',N'-tetraacetylethylene diamine (TAED)

A reaction vessel of 1000 ml., provided with a stirrer, thermometer, dropping funnel, a reflux cooler and receiver, was filled with 169 ml. of ethylene diamine 98% (=2.5 mols). By means of the dropping funnel 340 ml. of 99% acetic acid (=5.9 mols) were added in 30 minutes. ¾ of this quantity was added under slight cooling, the remaining quantity was added without cooling; the temperature was kept at approximately 110° C. all the time. In about 30 minutes the mixture was heated to approximately 145° C. At this temperature distillation of the water was started. The residual alkalinity determined at this moment showed a decrease to 38% of its initial value. After approximately 90% of the theoretical quantity of water had been distilled off, the remainder was removed under a vacuum of 500 mm. Hg at a temperature of 175° C. The reaction product obtained in this way was split into two parts. ⅔ by weight of the molten diacetylethylene diamine reaction product were dissolved in 1.3 litres (13.1 mols) acetic anhydride (95%) in a 2000 ml. reaction vessel provided with a stirrer, thermometer, dropping funnel, Vigreux column, cooler and receiver. The mixture was then heated to 140° C. whereby the acetic acid formed was distilled off. In 4 hours a total of 280 ml. distillate was collected. After the distillation was finished, the reaction mixture was cooled to about 5° C. and the crystals formed were filtered off, washed with acetic anhydride and dried. The yield obtained from this first crystallisation was 175.5 g. (=77%); melting point 145–148° C. The mother liquor was distilled again until 480 ml. distillate was collected. From the residue so obtained another 23.3 g. (=14%) of tetraacetylethylene diamine crystallised out, also with a melting point of 145–148° C. The total yield of crystalline tetraacetylethylene diamine obtained was thus 91%.

EXAMPLE III

Isolation of N,N'diacetyl ethylene diamine (DAED)

⅓ of the molten diacetylethylene diamine reaction product from Example II were recrystallised from a mixture of 430 ml. butanol and 1610 ml. butylacetate. The yield from this first crystallisation was 196 grams DAED (=93%). From the distillation residue of the mother liquor of the first crystallisation, another 10 grams (=5%) of crystals were obtained. The total yield of DAED obtained was thus 98%.

EXAMPLE IV

Preparation of N,N'-diacetylpropylene diamine

A reaction vessel of 1000 ml., provided with a stirrer, thermometer dropping funnel, Vigreux column, condenser and receiver, was filled with 185 grams of 1,3-propylene diamine (2.5 mols). By means of the dropping funnel 340 ml. of 99% acetic acid (=5.9 mols) were added in 30 minutes. ¾ of this quantity were added with slight cooling, the remaining quantity was added without cooling; the temperature was kept at approx. 110° C. all the time. The mixture was then heated to approx. 145° C. in 30 minutes after which the distillation of the water was started. The residual alkalinity of the reaction mixture at this stage was about 40% of its initial value. After approx. 90% of the theoretical quantity of water had been distilled off at a rate of about 0.1 mol $H_2O$ per minute, the remainder was removed under a vacuum of 500 mm. Hg at a temperature of 175° C. The reaction product obtained in this way was 435 grams.

After isolation and purification of the product the yield of crystalline N,N'-diacetyl propylene diamine was found to be 95%.

EXAMPLE V

Preparation of N,N'-diacetylhexamethylene diamine

A reaction vessel of 1000 ml., provided with a stirrer, thermometer, dropping funnel, Vigreux column, condenser and receiver, was filled with 290 grams of hexamethylene diamine (=2.5 mols). By means of the dropping funnel 340 ml. of 99% acetic acid (=5.9 mols) was gradually added in 30 minutes. ¾ of this quantity were added with slight cooling, the remaining quantity was added without cooling; the temperature was kept at approximately 110° C. all the time. In about 30 minutes the mixture was heated to approximately 145° C. during which time no water distilled off. At this temperature distillation of the water was then started. After approximately 90% of the theoretical quantity of water had been distilled off, the remainder was removed under a vacuum of 500 mm. Hg at a temperature of 175° C. The reaction product (515 grams; 100.3%) obtained in this way was split into two parts. ⅔ by weight (=309 grams) of this molten diacetyl hexamethylene diamine reaction product were recrystallised from 600 ml. butanol. The yield from this first crystallisation was 266 grams (86%). From the distillation residue of the mother liquor of the first crystallization another 37 grams (12%) of crystals were obtained. The total yield of crystalline N,N'-diacetyl hexamethylene diamine obtained was thus 98%.

EXAMPLE VI

Preparation of N,N,N',N'-tetraacetyl hexamethylene diamine

⅔ by weight (=206 grams) of the molten diacetyl hexamethylene diamine reaction product from Example IV were dissolved in 1.3 literes (13.1 mols) acetic anhydride (95%) in a 200 ml. reaction vessel, provided with a stirrer, thermometer, dropping funnel, Vigreux column, condenser and receiver. The mixture was then heated to 140° C. whereby the acetic acid formed was distilled off. In 4 hours a total of 310 ml. of distillate was collected. After this slow distillation the rest of acetic-anhydride was distilled off under diminished pressure. The residue (308 grams) crystallized on cooling. The crystal mass was mixed with 150 ml. of ether, filtered off, washed with 50 ml. of ether and dried. The yield obtained from this first crystallisation was 209 grams (74%), having a melting point of 56–59° C. The mother liquor was distilled under vacuum almost to dryness. The residue was cooled to 0° C. after adding 50 ml. ether and another 45 grams (16%) of crystals were collected. The total yield of crystalline tetraacetyl hexamethylene diamine obtained was thus 90%.

What is claimed is:

1. A process for preparing a polyacetylalkylene diamine from alkylene diamine, which process includes the steps of reacting a compound having the general formula:

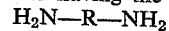

in which R is selected from the group consisting of alkylene and substituted alkylene groups having 2 to 6 carbon atoms in the straight chain connecting both nitrogen atoms, with acetic acid, keeping the water of reaction in the reaction mixture for some time until the reaction has run for more than half-way towards its completion, and thereafter distilling the water of reaction from the reaction mixture, to obtain a reaction product comprising diacetylalkylene diamine.

2. A process according to claim 1, wherein the removal of the water of reaction is started when the alkalinity of the reaction mixture has decreased to a value of 50–10% of its initial value.

3. A process according to claim 2, wherein said removal is started at an alkalinity of the reaction mixture of 40–20% of its initial value.

4. A process according to claim 1, wherein the alkylene diamine is reacted with an amount of acetic acid which is stoichiometric up to 25 mol percent in excess thereof.

5. A process according to claim 1, wherein an inert gas is introduced in the reaction mixture during the distillation of the water of reaction.

6. A process according to claim 1, wherein the rate of water removal from the reaction mixture does not exceed 0.06 mol $H_2O$ per minute per mol of reacting diamine 7. A process according to claim 6, wherein the rate of water removal is adjusted at 0.01–0.04 mol $H_2O$ per minute per mol of reacting diamine 8. A process according to claim 1, wherein said acetic acid is added gradually to the alkylene diamine whilst maintaining the temperature of the reaction mixture at 80–130° C. and the water of reaction is distilled off from the reaction mixture at increasing temperatures from 130–200° C.

9. A process for preparing a polyacetylalkylene diamine, comprising the steps of reacting a compound having the general formula:

$$H_2N\text{—}R\text{—}NH_2$$

in which R is selected from the group consisting of alkylene and substituted alkylene groups having 2 to 6 carbon atoms in the straight chain connecting both nitrogen atoms, with acetic acid, keeping the water of reaction in the reaction mixture for some time until the reaction has run for more than half-way towards its completion and thereafter distilling the water of reaction from the reaction mixture, leaving a reaction product which is subjected to a further acetylation reaction step using acetic anhydride to form a reaction product comprising essentially N,N,N',N'-tetraacetylalkylene diamine.

10. A process according to claim 9 wherein said further acetylation reaction is performed with excess acetic anhydride at boiling temperature and the acetic acid formed during the reaction is distilled off at a bottom temperature of 120–160° C.

11. A process for preparing N,N'-diacetyl ethylene diamine, comprising the steps of adding acetic acid to ethylene diamine whilst maintaining the temperature of the reaction mixture at 80–120° C. and keeping the water of reaction in the reaction mixture for some time until the reaction has run for more than half-way towards its completion, and thereafter distilling the water of reaction from said reaction mixture at increasing temperatures between 125° C. to 180° C.

12. A process for preparing N,N,N',N'-tetraacetyl ethylene diamine comprising the steps of reacting ethylene diamine with acetic acid, keeping the water of reaction in the reaction mixture for some time until the reaction has run for more than half-way towards its completion and thereafter distilling the water of reaction from the reaction mixture leaving a reaction product which is subjected to a further acetylation reaction step with excess acetic anhydride at boiling temperature and the acetic acid formed during the reaction is distilled off at a bottom temperature of approximately 140° C.

References Cited

UNITED STATES PATENTS 2,132,388   10/1938   Berchet   260—404.5

FOREIGN PATENTS 907,357   10/1962   Great Britain   260—561 R
1,046,487   10/1966   Great Britain   260—561 R

OTHER REFERENCES

Chem. Abstracts: Vol. 51, 6190$^h$.
Chem. Abstracts: Vol. 51, 14609$^h$.

LEWIS GOTTS, Primary Examiner

E. G. LOVE, Assistant Examiner